Aug. 25, 1953 — A. S. RITTER — 2,649,807
PLANT SHIPPING CONTAINER
Filed Nov. 28, 1950
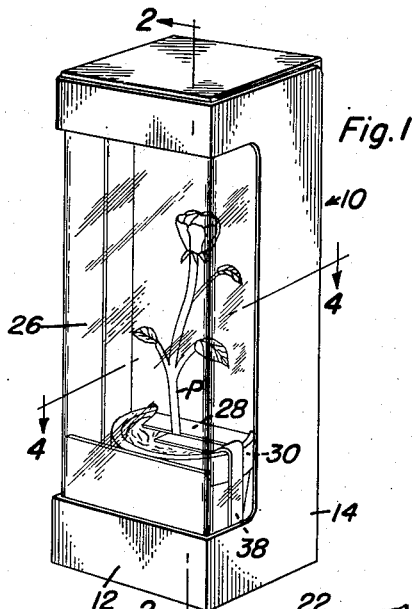
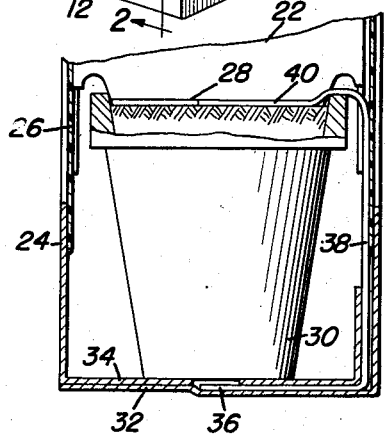
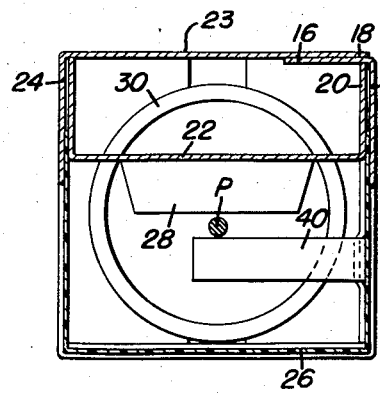
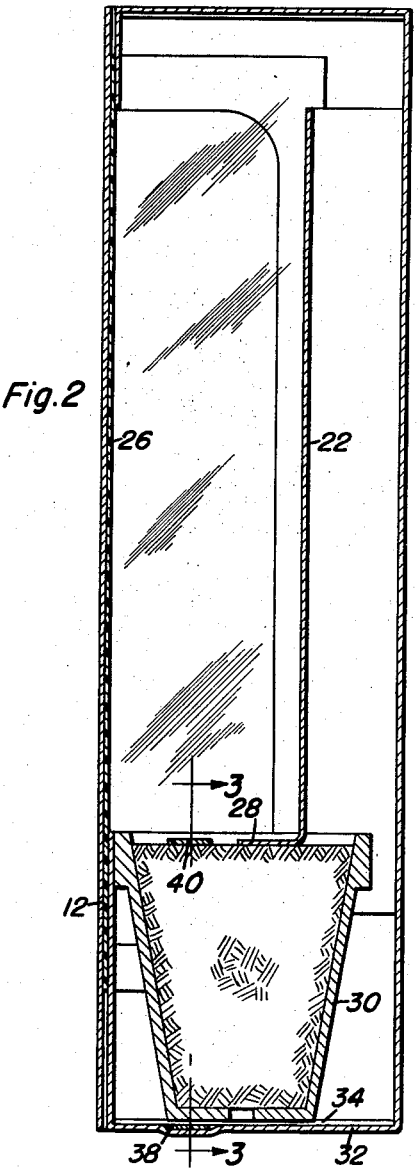
Inventor
Alexander S. Ritter Patented Aug. 25, 1953

2,649,807

UNITED STATES PATENT OFFICE 2,649,807

PLANT SHIPPING CONTAINER

Alexander S. Ritter, Brielle, N. J.

Application November 28, 1950, Serial No. 197,926

2 Claims. (Cl. 47—37)

This invention relates to new and useful improvements in containers and the primary object of the present invention is to provide a shipping container whereby a single plant and pot may be shipped, carried or displayed in a convenient manner and without the loss of soil in a plant pot.

Another important object of the present invention is to provide a plant shipping container including a U-shaped clip having a pair of spaced legs that will respectively engage the bottom wall of a plant pot and a soil in the plant pot to prevent the soil from becoming loose.

A further object of the present invention is to provide a plant shipping container having a transparent wall whereby a plant in the container will be positioned for observation.

A still further aim of the present invention is to provide a plant shipping container that is neat and attractive in appearance, simple and practical in construction, inexpensive to manufacture and assemble, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention in use;

Figure 2 is a longitudinal vertical sectional view taken substantially on the plane of section line 2—2 of Figure 1;

Figure 3 is a vertical sectional view taken substantially on the plane of section line 3—3 of Figure 2; and Figure 4 is a transverse horizontal sectional view taken substantially on the plane of section line 4—4 of Figure 1.

Referring now to the drawings in detail, wherein for the purpose of illustration, there is disclosed a preferred embodiment of the present invention, the numeral 10 represents a flexible container or hollow body constructed from cardboard or the like and including a forward wall 12 having an extension 14 that is provided with a tongue 16 which extends through a slot 18 in the side wall 20 of a channel 22 that is positioned within the container 10. The side wall 20 of channel 22 is integrally formed with the rear wall 23 of the container.

The wall 12, its extension 14 and one side wall 24 of the container are provided with communicating openings that are closed by a transparent flexible wall 26 of cellophane or the like whereby a plant P in the container may be easily viewed.

The lower end of the channel 22 is integrally formed with a flexible tongue 28 that will enter the upper end of a plant pot 30 to retain the pot at one end of the container and which will also tend to retain the pot centered in the container.

The container includes an end wall 32 that underlies the inturned end 34 of the wall 24. Walls 32 and 34 are secured in juxtaposed relation by cement or the like. The lower leg 36 of a U-shaped resilient clip 38 is received between the walls 32 and 34, and the upper offset leg 40 of the clip enters the upper end of the pot 30 to bear against the soil in the pot to retain the soil packed solidly as shown best in Figure 3.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A shipping container for potted plants, said container comprising an elongated hollow body having a rear wall, a longitudinal channel mounted within the body in front of and facing said rear wall and having a flexible tongue at one end spaced from one end of the body and adapted to fit into a plant pot to retain the pot at said one end of the body and substantially centered in the body, said body including an end wall underlying said tongue and a rear wall having an extension secured in juxtaposition with said end wall, and a U-shaped resilient clip including upper and lower leg portions, said lower leg portion being engaged between said extension and said end wall and said second leg portion having a downwardly offset free end portion for yieldingly engaging in a pot to hold soil therein.

2. The combination of claim 1 wherein said second leg portion is disposed alongside of said tongue.

ALEXANDER S. RITTER.

References Cited in the file of this patent

UNITED STATES PATENTS

| Number | Name | Date |
|---|---|---|
| 1,493,152 | Gardner | May 6, 1924 |
| 2,020,534 | Brown | Nov. 12, 1935 |
| 2,176,955 | Clow | Oct. 24, 1939 |
| 2,477,274 | Trecek | July 26, 1949 |